(12) United States Patent
Kopetz et al.

(10) Patent No.: US 11,936,767 B2
(45) Date of Patent: Mar. 19, 2024

(54) REAL-TIME COMPUTER SYSTEM AND METHOD FOR CONTROLLING A SYSTEM OR A VEHICLE

(71) Applicant: TTTech Auto AG, Vienna (AT)

(72) Inventors: Hermann Kopetz, Krumpendorf (AT); Stefan Poledna, Klosterneuburg (AT)

(73) Assignee: TTTech Auto AG, Vienna (AT)

( * ) Notice: Subject to any disclaimer, the term of this patent is extended or adjusted under 35 U.S.C. 154(b) by 336 days.

(21) Appl. No.: 17/229,094

(22) Filed: Apr. 13, 2021

(65) Prior Publication Data

US 2021/0328760 A1 Oct. 21, 2021

(30) Foreign Application Priority Data

Apr. 21, 2020 (EP) ..................... 20170659

(51) Int. Cl.
*H04L 7/04* (2006.01)
*H04Q 9/00* (2006.01)

(52) U.S. Cl.
CPC ................. *H04Q 7/04* (2013.01); *H04Q 9/00* (2013.01); *H04Q 2209/30* (2013.01)

(58) Field of Classification Search
CPC ....... H04L 7/04; H04L 12/40182; H04Q 9/00; H04Q 2209/30
See application file for complete search history.

(56) References Cited

U.S. PATENT DOCUMENTS

| 2006/0026017 | A1 | 2/2006 | Walker et al. |
| 2013/0262723 | A1 | 10/2013 | Luttenbacher |
| 2014/0343740 | A1 | 11/2014 | Eriksen et al. |
| 2016/0380858 | A1* | 12/2016 | Poledna ............. H04L 1/22 709/224 |
| 2017/0171350 | A1 | 6/2017 | Kopetz |
| 2017/0228281 | A1* | 8/2017 | Poledna ............. G06F 11/1645 |
| 2019/0258251 | A1* | 8/2019 | Ditty ................... G05D 1/0248 |
| 2019/0324454 | A1* | 10/2019 | Hansel ................ G05D 1/0061 |

(Continued)

OTHER PUBLICATIONS

Hermann, "Why do we need a Sparse Global Time-Base in Dependable Real-time Systems", pp. 13-20 (Year: 2007).*

(Continued)

*Primary Examiner* — Eyob Hagos
(74) *Attorney, Agent, or Firm* — Eversheds Sutherland (US) LLP

(57) ABSTRACT

The invention relates to a real-time computer system for controlling a technical device, the real-time computer system comprising data acquisition components which are independent of each other, as well as non-secure data processing components for processing sensor data. A time server as well as a first communication system and a second communication system independent of it are provided, the time server periodically sending global time signals to the communication systems. Each data acquisition component has two communication controllers, wherein each data acquisition component is connected by two communication controllers via a communication line to the first communication system, and is connected by another communication controller to the second communication system via a communication line, such that each data acquisition component can transmit its sensor data to each of the two communication systems.

10 Claims, 8 Drawing Sheets

(56) References Cited

U.S. PATENT DOCUMENTS

2019/0342081 A1* 11/2019 Tanimoto .............. H04L 9/0894
2021/0223788 A1* 7/2021 Garcia .............. B60W 60/0053

OTHER PUBLICATIONS

Kopetz et al. "Synchronization Strategy for a Time-Triggered Multicluster Real-Time System", pp. 154-161 (Year: 1995).*
European Search Report of European Application No. 20170659.5 dated Sep. 24, 2020.

* cited by examiner

REAL-TIME COMPUTER SYSTEM AND METHOD FOR CONTROLLING A SYSTEM OR A VEHICLE

CROSS-REFERENCE TO RELATED APPLICATIONS

This application claims priority to and the benefit of EP Application No. 20170659.5, filed Apr. 21, 2020, which is hereby incorporated by reference herein in its entirety.

FIELD

The invention relates to a real-time computer system, in particular a distributed real-time computer system, for controlling a technical device, e.g. a technical system or a machine, such as a robot or a vehicle, in particular a motor vehicle, the real-time computer system comprising data acquisition components that are independent of each other, wherein the data acquisition components are configured for acquiring sensor data, and comprising data processing components for processing the sensor data.

The invention further relates to a method for the automated control of a technical device, for example a technical system or a machine, such as a robot or a vehicle, in particular a motor vehicle, using such a real-time computer system, in particular an autonomous real-time computer system.

The invention falls within the field of computer technology. It describes an automation system and/or an architecture of such an automation system and a method for safe autonomous operation of a technical device, such as a technical system or a machine, such as a robot or a vehicle, in particular a motor vehicle.

BACKGROUND

The autonomous operation of a technical device, for example a technical system or a machine, such as a robot or a vehicle, in particular a motor vehicle, requires a real-time computer system that observes the environment of the machine or system with sensors, calculates the management of a process using a process model running on the real-time computer system, and influences the course of the physical processes via actuators. The environment can be observed, for example, with optical sensors (cameras), LIDAR, radar sensors, and other various sensors. The evaluation of the sensor data, the data fusion of the sensor data, and the creation of the required environmental models, as well as the planning of the desired process flow, require complex software components with millions of commands.

In many applications, for example the autonomous control of a vehicle, a system error in the real-time computer system can have serious effects. Such a fault can be triggered by a transient or permanent failure of the hardware of a component, or by a defect in the software (design error). In safety-critical applications, it is required that the mean time to fail (MTTF) of a serious failure at the system level must be greater than $10^9$ hours.

The ISO standard ISO 26262 on functional safety for the development, testing and certification of software in safety-relevant applications in the automotive industry introduces four ASIL (Automotive Safety Integrity Levels) safety levels, ASIL A (the lowest safety level), ASIL B, ASIL C and ASIL D (the highest safety level).

It is assumed in the case of complex software components with millions of commands, even with a rigorous development process and after very extensive tests, that the required reliability of $10^{-9}$ failures/hour (which corresponds roughly to the requirements of ASIL D) cannot be achieved. In addition to the software errors, the effects of transient and permanent hardware errors must also be taken into account in a software/hardware (SW/HW) component. The effects of a transient hardware failure are often indistinguishable from the effects of a software failure during operation.

SUMMARY

It is an object of the invention to provide a real-time computer system for controlling a technical device.

The Invention Proposes a Real-Time Computer System in which, According to the Invention, data acquisition components are non-secure components,
  the real-time computer system further comprises a time server, and a first communication system and a second communication system,
  wherein the time server is configured to periodically transmit global time signals to the first communication system via one or more unidirectional communication lines and to the second communication system via one or more unidirectional communication lines,
  wherein the communication systems are independent of each other,
  and wherein each data acquisition component has at least two, preferably exactly two communication controllers, each data acquisition component being connected by one of the at least two communication controllers via at least, and preferably exactly, one communication line to the first communication system and, and being connected by another of the at least two communication controllers via at least, and preferably exactly, one communication line to the second communication system, such that each data acquisition component transmits or can transmit its sensor data to each of the at least two communication systems,
  and wherein each data processing component has at least two, preferably exactly two communication controllers, each data processing component being connected by one of the at least two communication controllers via at least, and preferably exactly, one communication line to the first communication system and being connected by another of the at least two communication controllers via at least, and preferably exactly, one communication line to the second communication system, such that each communication system transmits or can transmit the sensor data received from the data acquisition components to each of the data processing components,
so that each data processing component can process the received sensor data.

Advantageous embodiments of the invention, which can each be implemented alone or in any combination with each other, are described below:

The time server is preferably fault tolerant.
  One, and in particular every, data processing component can consist of processing sub-components (VUKs) or comprise VUKs which are configured to exchange real-time data via a non-redundant, subordinate real-time communication system, a so-called real-time sub-communication system, wherein the real-time sub-communication system or a message distribution unit of the real-time sub-communication system which receives the sensor data transmitted to the data processing component, has at least two communication controllers, one of the at least two communication controllers being configured to receive the sensor data from the first communication system and another communication controller of the at least two communication controllers being configured to receive the sensor data from the second communication system, and wherein the real-time sub-communication system or a message distribution unit of the real-time sub-com communication system has a further communication controller, with which it is with a.

The at least two communication systems of the real-time communication system are preferably time-triggered.

The real-time computer system or the at least two independent communication systems can be configured to transmit the sensor data to at least two or more data processing components without feedback.

The connecting lines between the data acquisition components and/or data processing components on the one hand and the communication systems on the other hand are preferably galvanically isolated.

A data processing component can preferably directly access a sensor which is assigned only to this data processing component.

The real-time computer system can comprise a decision component, wherein each data acquisition component is connected to this decision component, the decision component preferably comprising fault-tolerant hardware in which simple software is executed.

When a data processing component detects a violation of the assumptions relating to the specified operational design domain (ODD), it can notify the decision component.

It can be provided that functions, in particular all functions of the computation of a trajectory, are carried out by a first, in particular non-secure, data processing component, that a verification of the safety of this calculated trajectory is carried out exclusively by a second, in particular non-secure, data processing component, and that the computation of an emergency trajectory is carried out exclusively by a third, in particular non-secure, data processing component, and preferably a decision regarding whether a fault has occurred is carried out by a—preferably single—decision component. The determination of the trajectory and the verification of the trajectory are thus clearly separated from each other.

The invention further relates to a method, mentioned at the outset, in which the real-time computer system can assume different system states, in particular at least the following system states:

State 301: the technical device is in a first safe state in which an operator can exercise control over the technical device;

State 302: the real-time computer system functions semi-autonomously and is continuously monitored by the operator;

State 303: the real-time computer system runs the technical device autonomously;

State 304: a fault has occurred in the real-time computer system;

State 305: the technical device is in a second safe state 305 in which it is brought by the real-time computer system through a minimum risk maneuver (MRM), wherein the operator does not have control over the technical device in the second safe state 305, but can take over control, wherein a transition between the system states is made by one or more state transitions, and wherein a fault is recognized by the decision component, and the real-time computer system switches from autonomous operation to the error state, and the real-time computer system brings the technical device into the safe state by means of the data processing component.

The proposed, in particular fault-tolerant real-time computer system for the safe automatic operation of a machine or a vehicle is based on the following design principles:

A component is a hardware/software unit that performs a specified service at one level of detail. The processing and transport of data are services performed by components.

The term component is preferably to be understood recursively—that is, the internal structure of a component can be represented on one (or more) lower levels of detail. The specified services of a component can be performed on the lower (more detailed) level of detail through a combination of (subordinate) components.

There are two types of components: secure components and non-secure components.

A secure component comprises software that was developed in accordance with the rules of ASIL D (=simple software). Simple software must run on fault-tolerant hardware in order to form a secure component.

Secure components meet the highest security requirements. In FIG. 1, the secure components are identified by a double frame.

Hardware that is not fault tolerant is non-secure.

A non-redundant sensor is non-secure.

A failure of an non-secure component must not lead to any safety-relevant event at the system level.

The mean time to fail (MTTF) of a secure component is assumed to be $10^8$ to $10^9$ hours. This value is the product of a rigorous development process for simple software according to ASIL D, such that all design errors can be eliminated during system development and from the required hardware redundancy, which masks an individual fault in the hardware.

If a component does not meet the criteria described above for a secure component, it is a non-secure component.

The mean time to fail (MTTF) of an non-secure component is assumed to be $10^4$ to $10^5$ hours. This value can be determined experimentally through particularly careful development in accordance with ASIL B, and by extensive testing in the field and through simulation. The high degree of reliability required at the system level can be achieved through a corresponding arrangement of redundant, non-secure components in the system architecture.

The topic of the arrangement of non-secure components is dealt with in the ISO 26262 standard. If, for example, two ASIL B components have to fail for a system failure to occur, the probability of a system failure is set to the level of an ASIL D component.

With the present invention, the proportion of the hardware of the sensors and of the communication system that must be implemented with redundancy is minimized, such that the system costs can be kept low.

BRIEF DESCRIPTION OF THE DRAWINGS

The invention is discussed in more detail with reference to the drawing, and illustrates one of the many possible forms of the invention. In the drawings.

DETAILED DESCRIPTION

Figure 1:
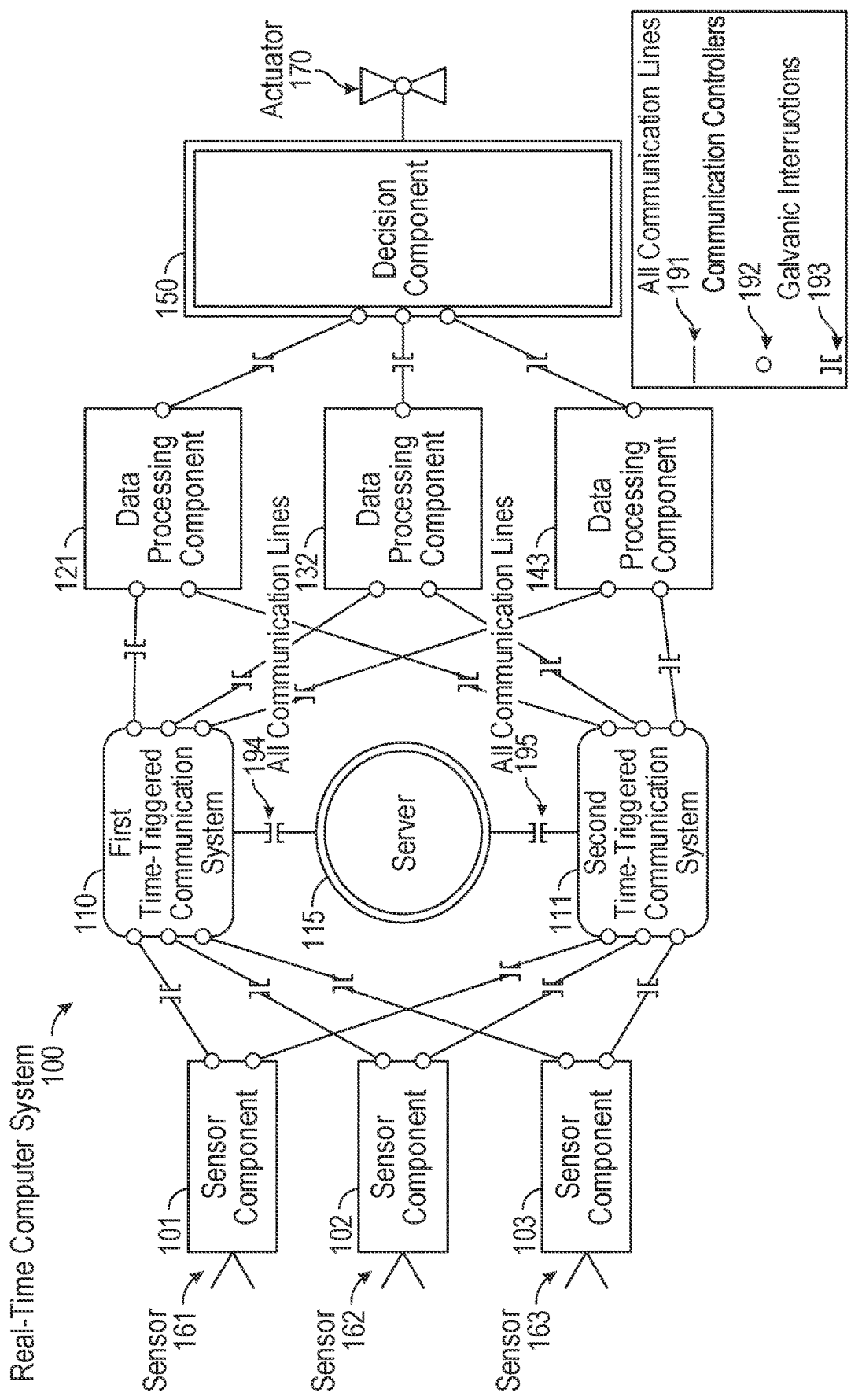
FIG. 1 shows the structure of a real-time computer system according to the invention.

FIG. 1 shows an example of an automation system or real-time computer system 100 which comprises data acquisition components (also referred to as "sensor components" below) 101, 102, 103, wherein sensor component 101 comprises a sensor 161, sensor component 102 comprises a sensor 162, and sensor component 103 comprises a sensor 163. Furthermore, the real-time computer system 100 comprises a first time-triggered communication system 110 and a second time-triggered communication system 111, as well as data processing components—in the example shown, three data processing components 121, 132, 143—as well as a decision component 150 and an actuator 170.

Furthermore, the real-time computer system 100 comprises a time server, preferably a fault-tolerant time server 115, which will be discussed in greater detail below.

The decision component 150 consists of fault-tolerant hardware with simple software which is developed in accordance with ASIL D and/or which corresponds to ASIL D and is therefore assumed to be secure.

Each component 101, 102, 103, 150, 121, 132, 143, as well as the time-triggered communication systems 110, 111 and the time server 115, have communication controllers 192 which form the end points of communication lines 191, 194, 195. All communication lines 191, 194, 195 preferably have galvanic interruptions 193 which prevent the propagation of a hardware fault.

The decision component 150 and preferably the time server 115 are secure. All other listed components can be non-secure.

The fault-tolerant time server 115 provides a fault-tolerant global time, in particular a fault-tolerant global sparse time—that is, a global time that is sparse [Kop11, p. 64]. The fault-tolerant time server 115 is connected to the first time-triggered communication system 110 via the communication line 194 and to the second time-triggered communication system 111 via the communication line 195, such that the two communication systems 110, 111 have access to the global time, in particular the global sparse time.

All the components listed have access to a fault-tolerant, global sparse time [Kop11, p. 64], which is made available by the time-triggered communication systems 110, 111. As explained above, the fault-tolerant global time is provided by the secure, fault-tolerant time server 115 and periodically transmitted to the time-triggered communication system 110 via the communication line 194, and periodically transmitted to the time-triggered communication system 111 via the communication line 195, and distributed by the communication systems 110, 111. The lines are preferably individual, since the communication systems 110, 111 are non-secure.

The secure, fault-tolerant time server 115 preferably has at least four independent clocks (oscillators) so as to be able to tolerate a *Byzantine* fault of one clock [Pea80].

The transmission of data from the communication systems 110, 111 to the data processing components 121, 132, 143 takes place without feedback, in only one direction, from the communication systems 110, 111 to the data processing components 121, 132, 143. As such, it is not possible for faults to propagate from the data processing components 121, 132, 143 to the communication systems 110, 111, and thus to the sensor components 101, 102, 103. It is known to a person skilled in the art how feedback-free communication can be established—for example, by unidirectional communication channels, by the arrangement of diodes in the transmission lines, or by measures in the software.

A transmission of data from the communication systems 110, 111 to the sensor components 101, 102, 103 is, however, possible—at least for the transmission of the global time.

The sensor data preferably preprocessed in the sensor components 101, 102, 103 are transmitted from the two time-triggered communication systems 110, 120 to the data processing components 121, 132, 143. In the normal case—that is, in the case where no faults have occurred—the sensor data of each sensor component 101, 102, 103 are transmitted via each of the two communication systems 110, 111 to each of the data processing components 121, 132, 143. It is assumed that the sensors 161, 162, 163 observe the surroundings, for example by means of different redundant methods, and thus the failure of a sensor 161, 162, 163 or a sensor component 101, 102, 103 can be tolerated. The failure of one of the two communication systems 110, 111 can be tolerated since all components are connected to both communication systems.

In autonomous driving, the term "trajectory of a vehicle" refers to the path that the vehicle follows as a function of time. The term trajectory is also applicable to the movement of a robotic arm.

A trajectory describes the path—that is, a smooth curve—of a moving object, as well as the target speeds and the time points which the object reaches at waypoints on the path.

Each trajectory is characterized by a number of properties. Examples of the properties of a trajectory are: the speed of the object, the centrifugal force that acts on the object, or the distance between a waypoint and an obstacle.

A safe trajectory is characterized in that important properties of the trajectory lie within intervals of prespecified limit values. A property is important if exceeding a limit value for that property can lead to an unintended event—an accident. For example, the limit value for the centrifugal force that acts on a moving object is an important property. In the case of a vehicle, this limit value depends on the one hand on the object (the speed of the vehicle) and on the other hand on the condition of the surroundings (condition of the road—dry, wet or icy).

In a vehicle, the two properties, steering angle and (positive or negative) acceleration—we call these two properties the essential properties of a trajectory—are of particular importance, since the steering angle and acceleration are determined by the real-time computer system. The data processing component 132 must therefore provide the limit values of these essential properties for the coming waypoint of each safe trajectory.

In certain traffic situations, several mutually exclusive trajectories can be safe. For example, a rock in the middle of a wide road can be avoided either to the left or the right, or the vehicle can be stopped immediately in front of the rock. Since the data processing component 132 has no information about which of these trajectories was planned by the data processing component 121, the data processing component 132 must calculate the essential properties of all safe trajectories which are relevant at a point in time.

A safe envelope is the combination of all limit values for the essential properties of all safe trajectories. A planned trajectory is safe if the essential properties of the trajectory lie within the intervals that are prespecified by the safe envelope.

In the case of autonomous driving, a data processing component—in the specific example the data processing component 121—calculates a planned trajectory of the vehicle, taking into account the wishes of the driver and the given environmental conditions detected by the sensors.

A data processing component—in this case, the data processing component 132—calculates a safe envelope of all safe trajectories and checks whether the environment of the vehicle corresponds to the specification of the operational design domain (ODD). An ODD specification indicates the specified conditions under which autonomous driving of a vehicle is possible. For example, it can be specified that snowfall is not provided for in the ODD, since adhering snow causes a sensor to fail temporarily. The data processing component 132, which determines a safe envelope of all safe trajectories, must at least be developed in accordance with the guidelines of ASIL B.

Another data processing component—in this case, the data processing component 143—calculates an emergency trajectory which guides the vehicle into a safe state after a fault has been recognized. The emergency trajectory must lead the vehicle to a safe state under all circumstances, including outside the specified ODD. The data processing component 143 must be developed at least in accordance with the ASIL B guidelines, although it is sufficient if it is developed in accordance with ASIL B. The service of the data processing component 143 is only required if there is a fault in the data processing component 121 or a fault in the data processing component 132.

The safe decision component 150—simple software developed in accordance with ASIL D on fault-tolerant hardware—decides whether the trajectory calculated by the data processing component 121 lies within the safe envelope that was provided by the data processing component 132. If this is the case, the trajectory calculated by the data processing component 121 is transferred to an actuator 170 for execution. If the calculated trajectory is not within the safe envelope, the decision component 150 will attempt to guide the vehicle into a safe state using the emergency trajectory calculated by the data processing component 143.

Alternatively, for example in the case of a robot controller, the decision component 150 can stop the movement sequence if the trajectory calculated by the data processing component 121 is not within the safe envelope which was calculated by the data processing component 132. In this case, the data processing component 143 is not required.

According to FIG. 2, a data processing component—for example, the data processing component 121—can have a hierarchical structure and consist of (subordinate) processing components 222, 223, 224—the so-called processing subcomponents ("VUK") (or several VUKs)—or comprise them, which exchange data by means of a subordinate time-triggered communication system (hereinafter "communication subsystem") 229. Since the data processing component 121 as a whole is non-secure, a single communication subsystem 229 is sufficient to transfer the data between the VUKs 222, 223, 224. However, it is important that the time-triggered communication subsystem 229 is connected to the two independent communication systems 110, 111 (FIG. 1) of the real-time computer system 100 via two separate communication controllers 192 in order to mask a fault in one of these two communication systems 110, 111. The line 210 in FIG. 2 corresponds to the line 191 from FIG. 1, which connects the component 121 to the communication system 110; the line 211 in FIG. 2 corresponds to the line 191 from FIG. 1, which connects the component 121 to the communication system 111.

The communication subsystem of the data processing component 121 is connected to the decision component 150 (see FIG. 1) via a further communication controller 192. The line 219 in FIG. 2 corresponds to the line 191 from FIG. 1, which connects the component 121 to the decision component 150.

Likewise, the data processing component 132 and/or the data processing component 143 can have a hierarchical structure.

Figure 2:
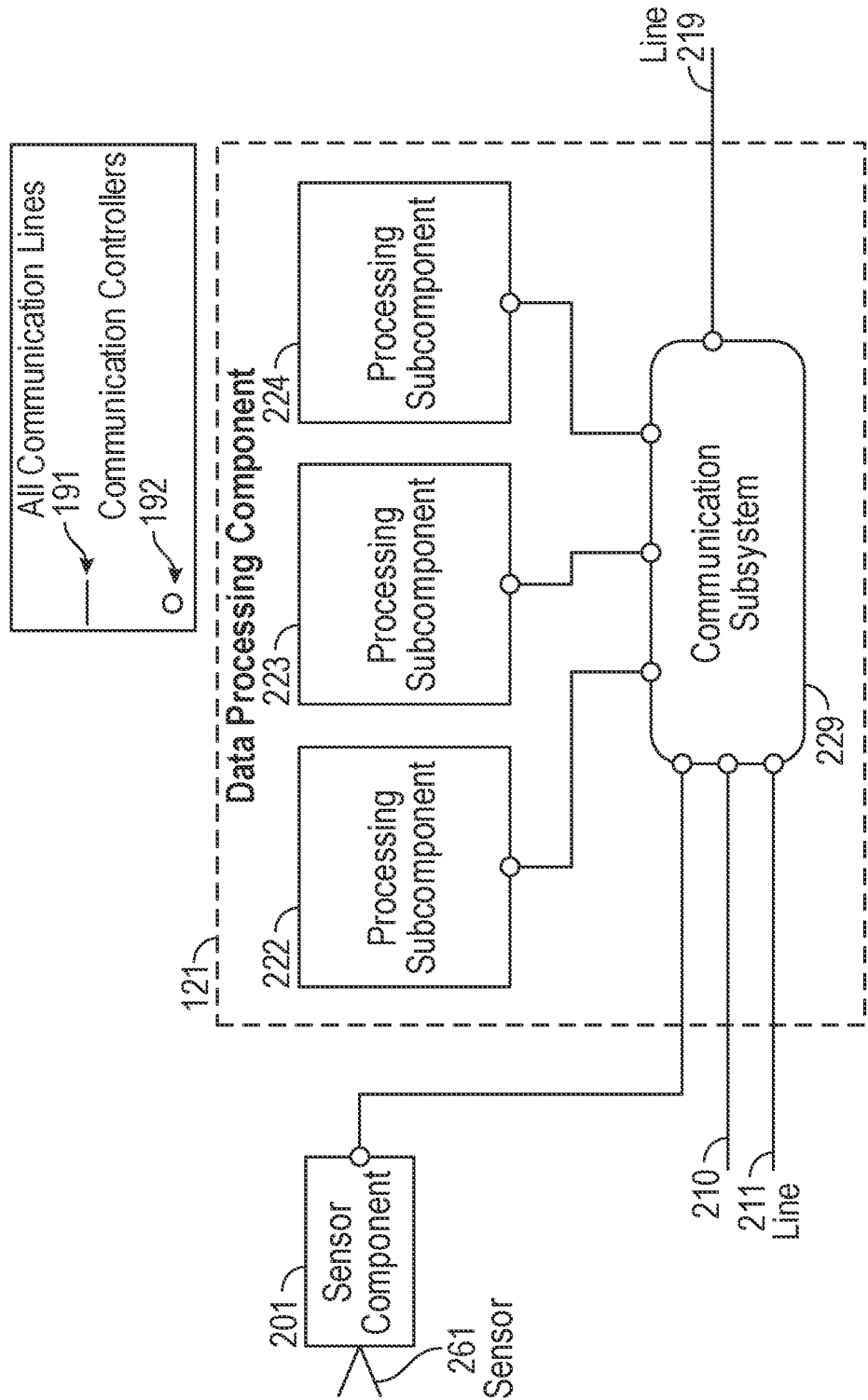
FIG. 2 shows the internal structure of a component of the real-time computer system of FIG. 1.

As in FIG. 2, a data processing component can also have one or more sensors of its own, which is/are only assigned to this one data processing component—for example, a sensor 261 which is coupled to the time-triggered communication subsystem 229 of the data processing component 121 via a sensor component 201.

For example, the sensor 261 can be an (additional) camera which improves the functionality of the corresponding data processing component 121 or enables a minimum function, for example if both communication systems 110, 111 have failed.

Figure 3:
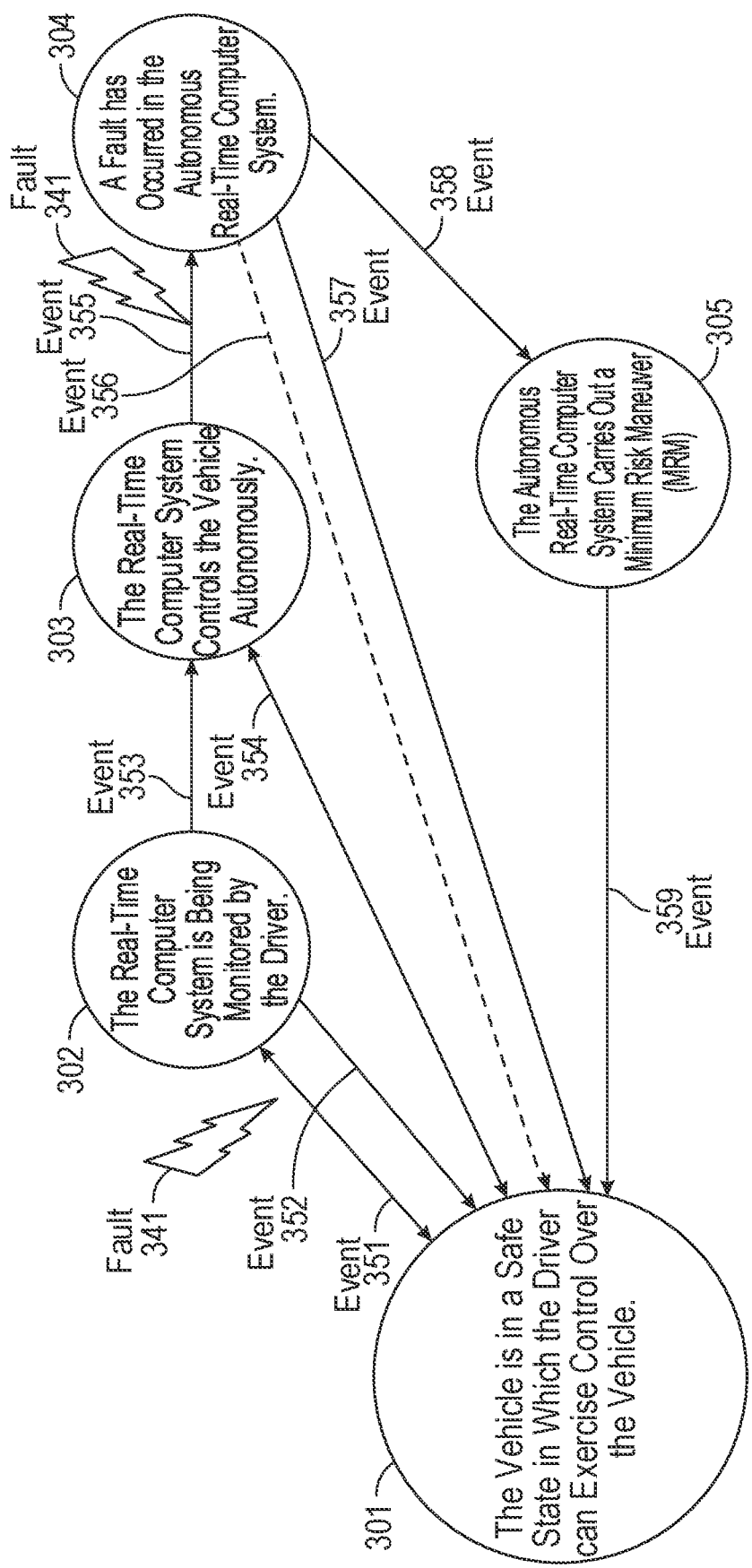
FIG. 3 shows system states and state transitions in such a real-time computer system.

FIG. 3 shows a state transition diagram during the autonomous guidance of a vehicle.

The following states are introduced in FIG. 3:
State 301: the vehicle is in a safe state in which the driver can exercise control over the vehicle.
State 302: the real-time computer system is being monitored by the driver.
State 303: the real-time computer system controls the vehicle autonomously.
State 304: a fault has occurred in the autonomous real-time computer system.
State 305: the autonomous real-time computer system carries out a minimum risk maneuver (MRM) in order to bring the vehicle to a safe state 305. State 304 signifies the fault state during which the MRM is carried out. State 304 begins with the occurrence of the fault and ends with the safe state 305. In state 305, the vehicle is, for example, at the roadside. The driver can assume control while the MRM 305 is carried out—or not. He can also later, after the MRM has been successfully terminated in state 305, take control following state 301.

There are therefore two safe states: a state 305 without driver control (but the driver can assume control) and a second state 301 where the driver is (constantly) in control.

A fault 341 occurs if a fault has occurred in the vehicle or if the environment of the vehicle no longer corresponds to the intended operational design domain (ODD).

A state transition is triggered by an event. The following state transitions are introduced in FIG. 3:
Event 351: The driver switches the real-time computer system from the safe state 301 to the monitored operation 302, or the driver switches the real-time computer system from the monitored operation 302 to the safe state 301.

Event 352: A fault 341 is detected by the decision component 150, since the trajectory calculated by the data processing component 121 does not lie in the safe envelope calculated by the data processing component 132, or because the data processing component 132 has detected an ODD violation. The real-time computer system switches from monitored operation 302 to the safe state 301, in which the vehicle is controlled by the driver.

Event 353: The driver switches the real-time computer system from monitored operation 302 to autonomous operation 303.

Event 354: The driver switches the real-time computer system from the safe state 301 to autonomous operation 303, or the driver switches from the autonomous operation 303 to the safe state 301.

Event 355: A fault 341 is recognized by the decision component 150, since the trajectory calculated by the data processing component 121 does not lie in the safe envelope calculated by the data processing component 132, or because the data processing component 132 has detected an ODD violation. The real-time computer system switches from autonomous operation 303 to the fault state 304.

Event 356: The real-time computer system informs the driver of the fault state 304 that has arisen.

Event 357: The driver takes control and guides the real-time computer system from the fault state 304 to the safe state 301.

Event 358: The real-time computer system initiates a minimum risk maneuver (MRM) and applies the emergency trajectory that was determined by the data processing component 143 in order to bring the vehicle into the safe state 305.

Event 359: The driver takes control of the vehicle starting from state 305.

By separating the functions of calculation of a trajectory by the non-secure data processing component 121, the verification of the safety of the calculated trajectory by the non-secure data processing component 121, the calculation of an emergency trajectory by the non-secure data processing component 143, and the decision-making regarding whether there is a fault by the single decision component 150, the real-time computer system is considerably simplified [Kop19].

The present disclosure presents a safe solution for automating a vehicle or a machine, and is therefore of great economic importance.

In particular, the invention makes it possible for all data processing components to be supplied with sensor data from the same sensors—i.e. it is not necessary for each data processing component to have its own sensors—which allows for significant reductions in the cost of a real-time computer system according to the invention. At the same time, however, the safe automation of a machine or a vehicle is ensured.

A possible technical implementation of a time server (referred to above by "115"), as it can be used in the present invention, is shown below.

The following definitions of terms are used, which basically apply within the scope of the entire present disclosure, although individual definitions of terms, in the event that they conflict with the explanations above, only apply in connection with the explanations relating to FIG. 4-8:

Bi-directional communication channel: A communication channel over which messages can be transmitted in both directions.

Computer of a real-time system: One of the plurality of computers in the distributed real-time computer system that receives synchronization messages from the time server. Synonymous with external receiver.

Receiver of a message (synchronization message): Component of the time server that receives the message from another component of this time server.

External synchronization message: A synchronization message for synchronizing the clocks outside of a time server. According to the invention, an external synchronization message must be fail-silent, i.e. it is either correct or is recognized as incorrect. The error detection of a synchronization message that is incorrect in the value range can be carried out by checking an electronic signature which is contained in the external synchronization message.

External receiver: Every computer in the distributed real-time computer system whose clock is synchronized with global time by external synchronization messages transmitted periodically by the time server.

External time of reception: The a priori defined time at which a correct external synchronization message arrives at the external receiver and which is contained in a payload of the external synchronization message.

External synchronization time: A periodically recurring point in time that is defined as part of the system design and at which an external synchronization message is transmitted from a component of the time server to another internal component of the time server. The external synchronization message is transmitted precisely just to this one internal component, wherein the latter also does not receive external synchronization messages from any other internal components of the time server. The (internal) transmission of the external synchronization messages between two components of the time server takes place directly via a communication line which connects the two components directly, without going through other components.

Fault hypothesis: The assumptions about the faults to be tolerated in a fault-tolerant computer system [Kop11, p. 154].

Fault-tolerant clock synchronization algorithm: An algorithm for fault-tolerant synchronization of clocks in a distributed computer system [Kop11. p. 69].

Recorded time of reception: The time at which an external synchronization message was received, measured with the clock of the external receiver. The accuracy of the measurement of the recorded time of reception can be improved by a hardware mechanism.

Global time: The time transmitted by the time server, the corresponding ticks of which are within a defined accuracy for all external receivers (see [Kop11, p. 55] regarding the term "accuracy").

GPS time: A worldwide time signal, synchronized with the SI second, which is transmitted by the GPS system and can be received by a GPS receiver [Dan97].

GPS receiver: An electronic component that receives satellite signals from GPS satellites and that transmits a time signal (expressed in SI seconds) to the time server, in particular to the time server components connected to the GPS receiver [Dan97].

Valid external synchronization message: An external synchronization message is valid if the content of the message matches the signature contained in the message.

Internal synchronization message: A synchronization message for the internal synchronization of the tick counters of the components within a time server. Internal synchronization messages are transmitted between the internal components of a time server.

Internal synchronization time: A periodically recurring point in time that is defined as part of the system design and at which an internal synchronization message is transmitted.

Communication controller: The structural unit within a computer which establishes the connection between an external communication channel and the memory of the computer and which handles the communication protocol.

Component: A computer with an oscillator, a tick counter and the necessary software inside the time server.

SI second: International standard of the second [Tay01].

Start-up message: A message within the time server for internal clock synchronization which is transmitted in the start-up phase.

Start-up phase: A time interval immediately after the power-up of internal components of the time server. During the start-up phase, the tick counters of the components are synchronized using a central master algorithm [Kop11, p. 68].

Independent communication controllers of the time server: Two communication controllers of the time server are independent if they are arranged on or in different internal components.

Time server: An apparatus or a device comprising at least four components for creating a fault-tolerant global time.

Figure 4:
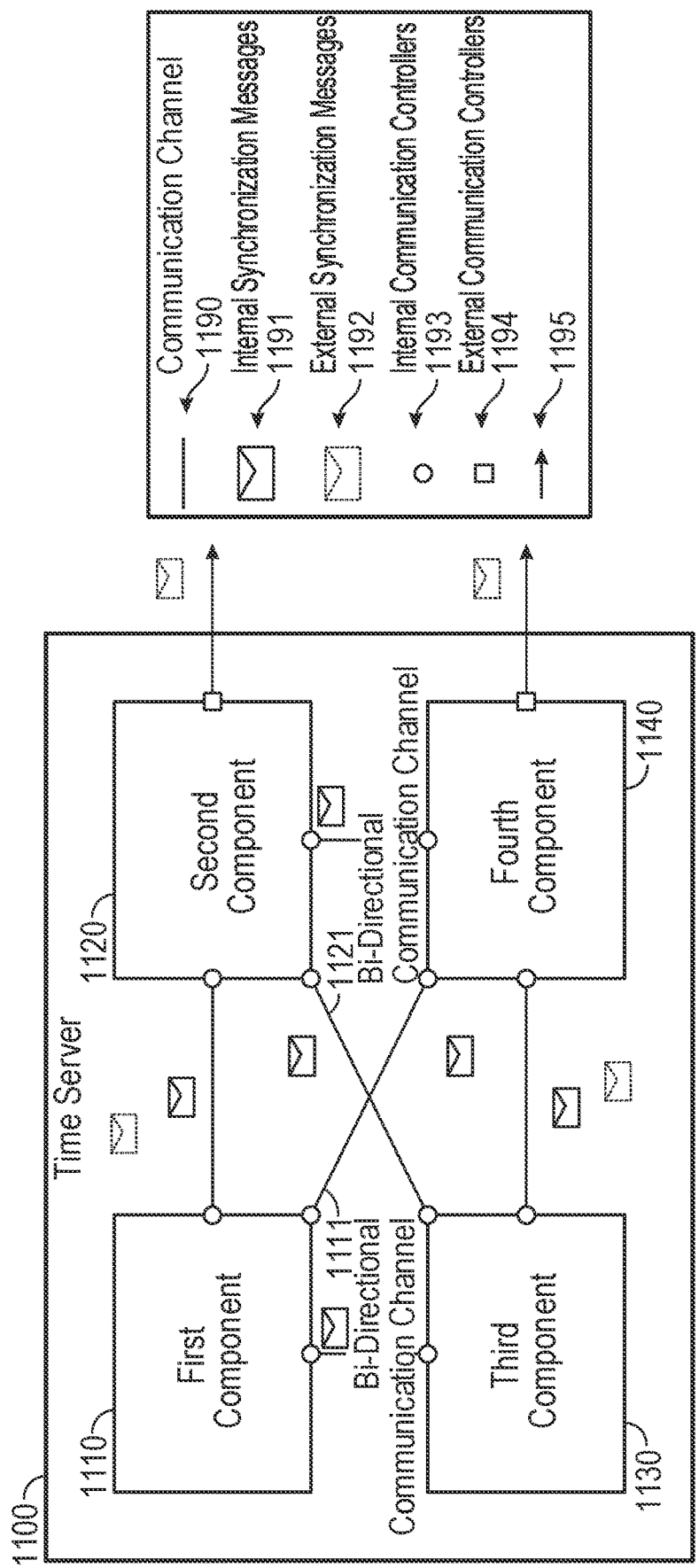
FIG. 4 shows an example of a time server with four internal components.

FIG. 4 shows a time server 1100 having four components 1110, 1120, 1130, 1140: a first component 1110, a second component 1120, a third component 1130 and a fourth component 1140.

The first component 1100 is connected to each of the other three components—that is, to the second, third and fourth components 1120, 1130, 1140—the second component 1120 is connected to each of the other three components (first, third and fourth) 1100, 1130, 1140, the third component 1130 is connected to each of the other three components (first, second and fourth) 1100, 1120, 1140 and the fourth component 1140 is connected to each of the other three components (first, second, third) 1100, 1120, 1130 via, in each case, a bi-directional communication channel 1190, 1111, 1121 for the transmission of messages by means of internal communication controllers 1193 of the given component.

In FIG. 4, a distinction is made between two types of messages, internal synchronization messages 1191 and external synchronization messages 1192. The external synchronization messages 1192 are preferably signed.

In the example according to FIG. 4, each component has three internal communication controllers 1193. The three internal communication controllers 1193 of a component are able to transport internal synchronization messages 1191 in both directions (bi-directionally).

Furthermore, in the example shown, the second and fourth components 1120, 1140 each have a so-called "external" communication controller 1194. These two external communication controllers 1194 can transport the external synchronization messages 1192 preferably only in one direction (uni-directionally)—in the direction from the time server to the external receivers of the distributed real-time computer system.

The internal communication channels 1190 between the components 1100 and 1120, as well as the components 1130 and 1140, can be used to transmit both the internal synchronization messages 1191 and the external synchronization messages 1192.

An external communication controller 1194 can also transmit the external synchronization messages 1192 to its external receivers via a wireless radio channel. However, it must be ensured that the two communication controllers 1194 transmit the two external synchronization messages 1192 simultaneously, for example on different frequency bands.

Each of the four components 1100, 1120, 1130, 1140 of FIG. 4 has an internal computer with an oscillator and a local tick counter, as well as software that executes a clock synchronization algorithm. After switching on a component, the power-up, an initialization routine is launched which initializes the local tick counter of each component with the value zero. The value of the local tick counter is increased by 1 per period of the oscillator.

After the power-up, the start-up phase of the time server begins. During the start-up phase, an exceptional component, for example component 1100, takes on the role of a central time master. The time master simultaneously transmits an internal start-up message 1191 with the contents of its local tick counter at the time of transmission via its three internal communications controllers 1193 to the other three components 1120, 1130, 1140. Each (component-internal) receiver 1120, 1130, 1140 of the startup message corrects the tick counter contained in the startup message by an a priori known transport delay of the startup message and writes this corrected value into its tick counter. At this point in time, the local tick counters of all clocks are then synchronized. The time at which an incoming message arrives in a component can be precisely recorded by use of supporting hardware mechanisms.

As part of a system design—a priori—periodic internal synchronization times are defined at which the local tick counters of the components are corrected in order to correct the deviations in their clocks that occurred in the time interval between two internal synchronization times.

Each of the four components simultaneously transmits an internal synchronization message 1191 at each internal synchronization time via its three internal communication controllers 1193 to all other components of the time server. An internal synchronization message 1191 contains the reading of the local tick counter of the given transmitter in the payload at the time of transmission.

Each receiver of an internal synchronization message 1191 records the reading of its local tick counter at the time when the internal synchronization message 1191 is received (preferably by hardware mechanisms in the communication controller 1193).

According to FIG. 4, each component contains three internal synchronization messages 1191 via the three internal communication controllers 1193. For example, the first component 1100 receives an internal synchronization message from each of the components 1120, 1130, 1140.

Each component determines the time differences between the transmission times contained in the internal synchronization messages and the recorded time of receptions, corrected for the a priori known delays of the internal synchronization messages, and transfers these time differences to a fault-tolerant clock synchronization algorithm. In FIG. 4, the clock synchronization algorithm in the first component 1100 has four time differences available to it, three from the messages of the components 1120, 1130 and 1140, and the zero time difference from the tick counter of the component 1100. (The component 1100 assumes that it is correct.)

In detail, at a priori periodic, internal synchronization times, each of the four components 1110, 1120, 1130, 1140 sends an internal synchronization message containing the reading of its local tick counter at the time the internal synchronization message was sent to the other three components simultaneously, wherein each receiver of an internal synchronization message records the reading of its local tick counter at the time of receipt of the internal synchronization message, and determines the time difference between the time of transmission contained in the internal synchronization message and the recorded time of receipt of the internal synchronization message, corrected by the a priori known delay of the internal synchronization message, and wherein each internal computer of a component determines a correction term for the tick counter contained in its component from these time differences in accordance with a fault-tolerant clock synchronization algorithm, and corrects the reading of the local tick counter by this correction term, and wherein two of the four components, for example the first component 1110 and the third component 1130, each form one external synchronization message 1192, which contains an a priori defined external reception time of this external synchronization message, wherein both external synchronization messages contain the same external reception time, and they transmit external synchronization messages at the same time, at a priori fixed, periodic external synchronization times, each via a communication channel 1190 directly to one of the other components 1120, 1130, but not to the same of the other two components—for example, the first component 1110 transmits to the second component 1120, and the third component 1130 transmits to the fourth component 1140.

Each of the components (1120, 1140) of the time server (1100) to which an external synchronization message has been transmitted verifies whether the external time of reception contained in the received external synchronization message measured with respect to the reading of its local tick counter at the time the external synchronization message is received is set in the manner in which it is specified by an a priori planning of the external synchronization time and the external time of reception, and, if this is not the case, discards the external synchronization message, and if this is the case, forwards the external synchronization message via an external communication controller 1194 of the component 1120, 1140 to an external receiver at a point in time, in particular an a priori defined time, which ensures that the external synchronization message arrives at the external receiver at the external time of reception contained in the external synchronization message, and wherein each external receiver records the receipt time of the external synchronization message arriving first using its local clock and then corrects the status of its local clock by the difference between the recorded receipt time of the external synchronization message and the external receipt time contained in the external synchronization message.

Fault-tolerant clock synchronization algorithms are described in detail in the technical literature [e.g., Kop11, p. 69]. A fault-tolerant clock synchronization algorithm is executed in each component and determines a correction value for the individual clock from the totality of the determined time differences of all clocks. The tick counter of the individual clock is corrected with this correction value. The term accuracy of an ensemble describes the precision of the internal synchronization [Kop11, p. 55].

As part of the system design, periodic external synchronization times and corresponding times of reception of an external synchronization message 1192 are set at an external receiver. An external synchronization message 1192 contains in its payload the planned time of reception of this message at the external receiver and preferably an electronic signature of the transmitter—that is, the creator of the external synchronization messages 1192 (in the present case, these are the components 1100, 1130). It is assumed that the transmitter's electronic signature cannot be forged.

An external synchronization message 1192 can also contain in its payload information about the internal state of a component.

The periodic synchronization times of the external synchronization messages should preferably be selected such that the time interval between two synchronization messages corresponds to a (negative) power of the SI second. This time difference can be derived from the GPS time, which uses the SI second as the basis for time counting. If the external synchronization messages are synchronized with the GPS time, the time basis of the distributed computer system is synchronized worldwide with all other computers that are based on the GPS time.

Figure 5:
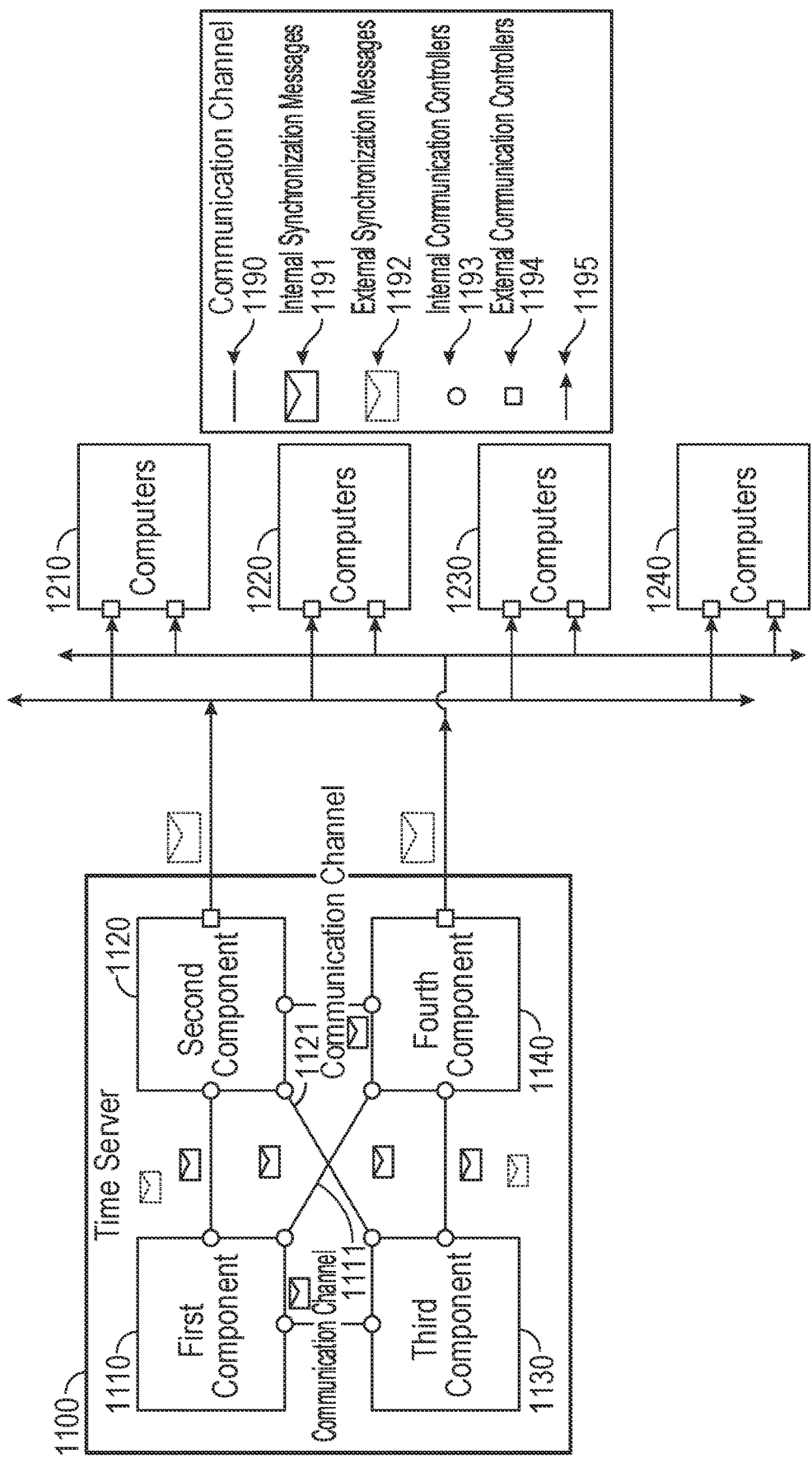
FIG. 5 shows the structure of a distributed real-time computer system having four computers that are supplied with periodic external synchronization messages by a fault-tolerant time server according to FIG. 4.

FIG. 5 shows a real-time computer system having four computers 1210, 1220, 1230, 1240 which are connected to a fault-tolerant time server according to FIG. 4. The first component 1100 of the time server 1100 according to FIG. 4 transmits an external synchronization message 1192 intended for the computers 1210, 1220, 1230, 1240 via its internal communication controller 1193 to the internal communication controller 1193 of the second component 1120. The second component 1120 verifies the correctness of the external time of reception contained in the external synchronization message. This external time of reception is valid if the reading of the clock of the component 1120 at the time of reception of the external synchronization message is within an interval defined a priori before the external time of reception which is contained in the external synchronization message. If the external synchronization message is not valid, it is rejected. Otherwise, the external synchronization message is transmitted from the second component 1120 via its unidirectional external communication controller 1194 to the computers 1210, 1220, 1230, 1240 at a point in time which ensures that the message arrives at the computers 1210, 1220, 1230, 1240 at the time of reception contained in the external synchronization message. The second component 1120 cannot change the external time of reception contained in the external synchronization message, because this external synchronization message is signed by, for example, the first component 1100.

When applied to the example from FIG. 1, the time server 1100 corresponds to the time server 115 from FIG. 1. Each of the time servers is connected to a real-time communication system (110, 111 in FIG. 1) by means of the two communication controllers 1193, 1194. Each of the real-time communication systems 110, 111 is connected to the components 101, 102, 103, 121, 132, 143 from FIG. 1 (these correspond to the computers 1210, 1220, 1230, 1240).

The fourth component 1140 carries out the method described above simultaneously with respect to the second external synchronization message 1192 and transmits it to the computers 1210, 1220, 1230, 1240 of the real-time computer system.

The fourth component 1140 receives the external synchronization message 1192 internally from the third component 1130.

In general, it is preferable that two components (here the second and fourth components) simultaneously transmit an external synchronization message to the outside. Each of these two components receives the external synchronization message internally from another—and only from this—component, e.g. the second component receives this from the first component (and only from it) and the fourth component receives this from the third component (and only from it). The component that generates the external synchronization message and transmits it internally to the component assigned to it preferably signs this external synchronization message.

In the structure shown in FIG. 4, it would also be conceivable that the first component transmits the external synchronization message internally (only) to the fourth component, and the third component transmits the external synchronization message (only) to the second component.

It is clear to a person skilled in the art that it could of course also be provided that other components (e.g. first and second components) also transmit the external synchronization messages in pairs to the outside, and they internally transmit the external synchronization messages from the other two components, e.g. from the third component and from the fourth component.

FIG. 5 shows four external receivers 1210, 1220, 1230, 1240 of the distributed real-time computer system, the clocks of which are supplied with the global time by the fault-tolerant time server 1100. Each of these four external receivers receives two external synchronization messages via the two independent external communication controllers 1194 of the corresponding components 1120, 1140 of the time server 1100 within the accuracy around the time of reception contained in the external synchronization message.

An external synchronization message arriving at an external receiver is valid if the content of the message matches a signature contained in the message.

The difference between the time the first valid external synchronization message 1192 recorded by the external receiver arrives and the time of reception contained in the first valid external synchronization message 1192 is used to set the reading of the clock of the external receiver to the received global time. The second external synchronization message 1192 arriving later is discarded by the external receiver because it may have been delayed inadmissibly by a defective transmitter (e.g. by a defective component 1120).

The fault hypothesis of a fault-tolerant system indicates which type of faults are tolerated by the system [Kop11, p. 145]. In the present case it is assumed that each component of the time server forms an independent fault containment unit (FCU) and that each FCU can fail in any way, i.e. the type of fault of an FCU is not restricted. Furthermore, the fault hypothesis assumes that only one component of the time server is defective during operation.

If one of the four components of the time server 1100 becomes faulty, then this fault is masked by the proposed system architecture of the time server. If, for example, component 1100 in FIG. 4 is faulty and transmits an external synchronization message 1192, which is intended for external receivers 1210, 1220, 1230, 1240, to component 1120 at an incorrect point in time, component 1120 will detect the message as faulty and discard it. The second external synchronization message 1192, which is intended for the external receivers 1210, 1220, 1230, 1240, originates from the third component 1130 and is checked by the fourth component 1140. Since, according to the fault hypothesis, only one component—in this case component 1100—can be defective, the second synchronization message will arrive correctly at the external receivers 1210, 1220, 1230, 1240.

If the checking component delays an external synchronization message 1192 due to a fault, this external synchronization message will arrive at the external receiver after the other valid external synchronization message 1192 and will be discarded by the external receiver. If a checking component changes the content of an external synchronization message 1192, the external synchronization message 1192 becomes invalid and is discarded by the external receiver.

Figure 6:
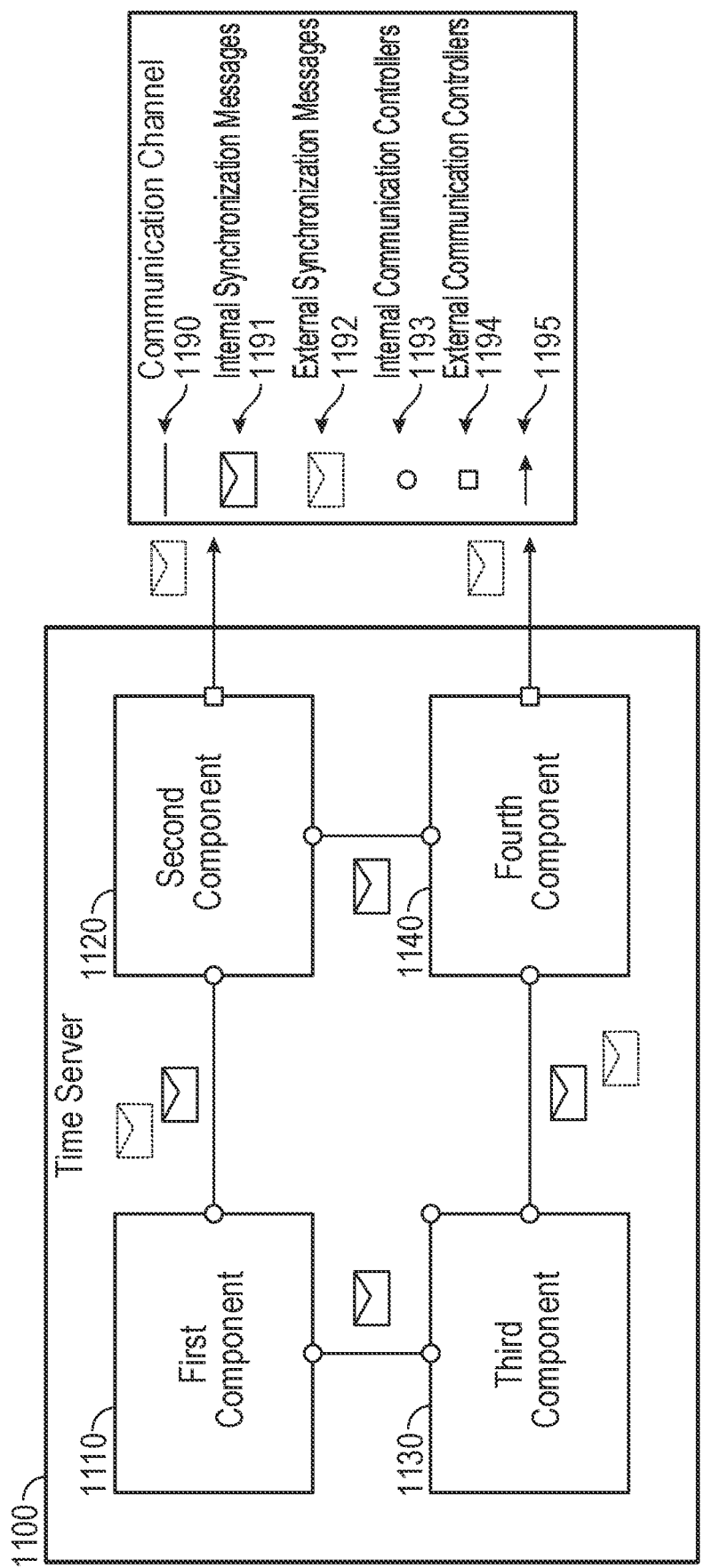
FIG. 6 shows a further embodiment of a time server.
Figure 7:
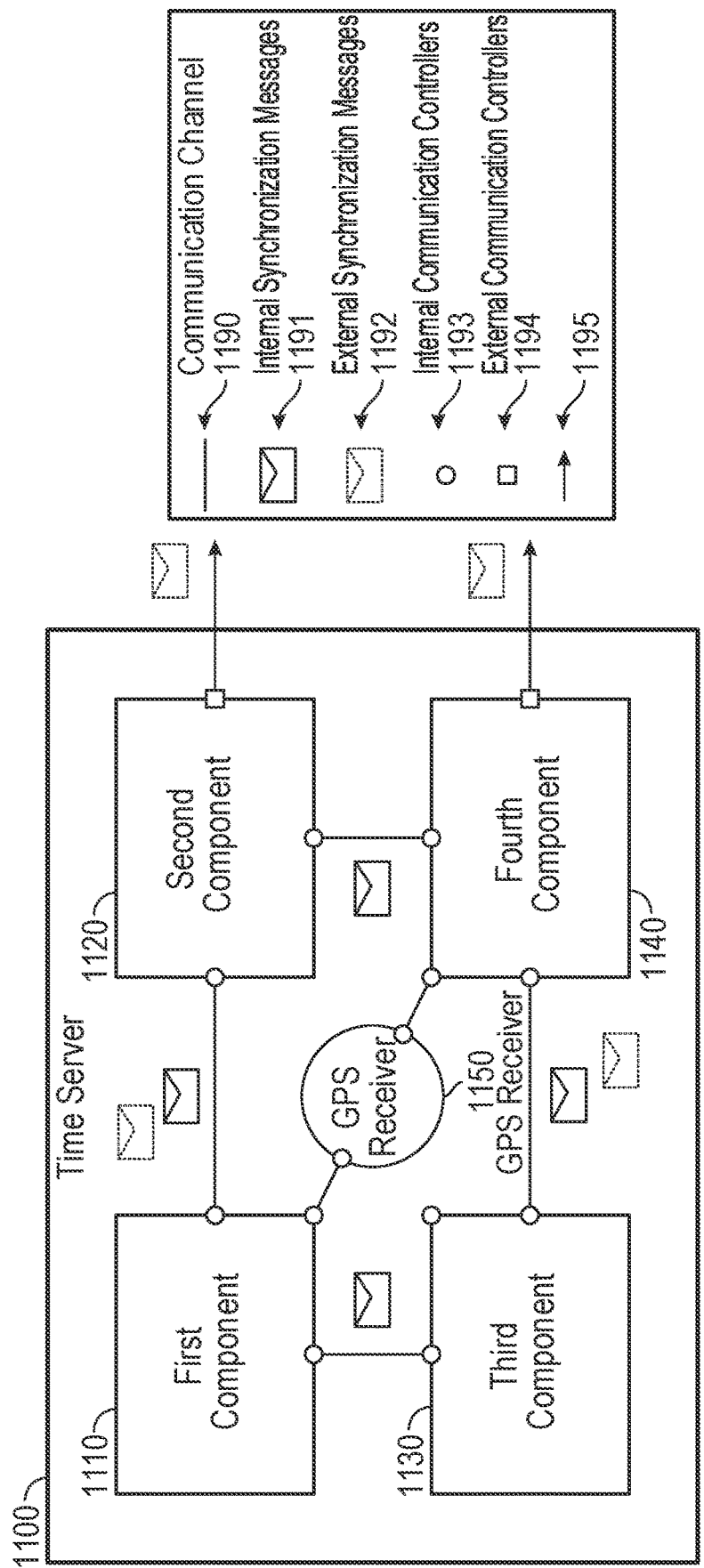
FIG. 7 shows a time server having a receiver for receiving GPS signals to synchronize the global time with the GPS time.
Figure 8:
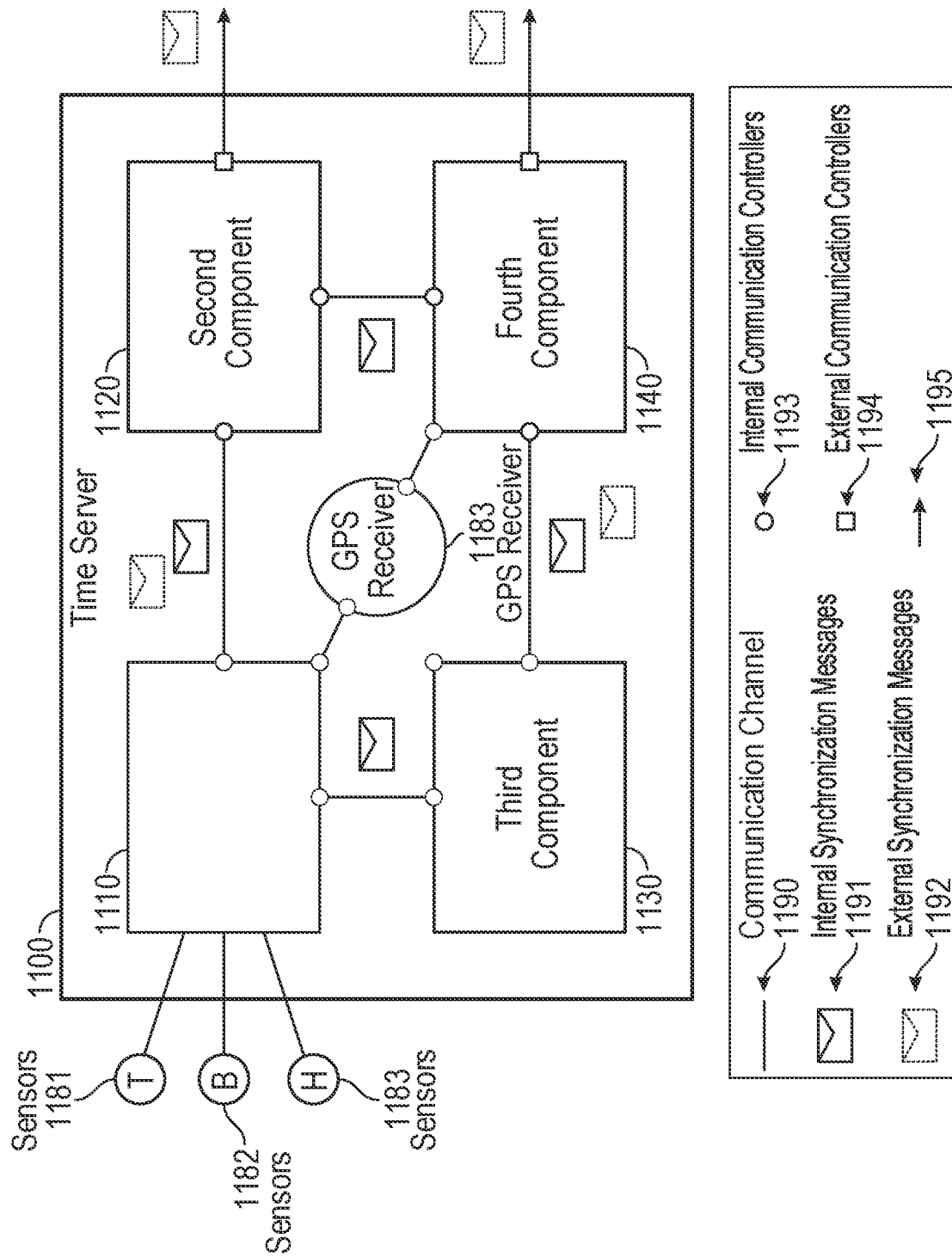
FIG. 8 shows a time server according to FIG. 7, with sensors for detecting the state of the environment.

FIG. 6 shows a time server 1100 in which the communication channel 1111 between the first and fourth components 1100, 1140 of FIG. 7, and the communication channel 1121 between the second and third components 1120, 1130 of FIG. 7, are missing. By omitting these two communication channels, four internal communication controllers 1193 and two signal lines can be saved. The price to offset these savings is the introduction of a two-stage transmission of the internal synchronization messages. For example, an internal synchronization message must be transmitted from the first component 1100 to the fourth component 1140 in the first stage from the component 1100 to the component 1120 and in the second stage from the component 1120 to the component 1140. The additional time delay caused by this two-stage transmission method must be corrected in the receiving component 1140.

FIG. 7 shows a time server 1100 having a GPS receiver 1150 for synchronizing the global time with the GPS time. The GPS signal of the Global Positioning System contains a worldwide synchronized time signal having a precision of better than 100 nsec. By means of this signal, the global time of the external receivers can be synchronized worldwide.

It is advantageous if the components of the time server that take over the time signal from the GPS receiver 1150 check this time signal for plausibility. For example, the dynamics of the field strength of the incoming GPS signals can be monitored, or a sudden change in the time offered can be determined in order to detect an intrusion.

The time server can also have sensors for measuring the environmental parameters in order to compensate for the drift rate of the oscillators caused by these environmental parameters. Examples of such environmental parameters are temperature T, barometric pressure B, and humidity H, which can be detected with corresponding sensors 1181, 1182, 1183, as is depicted by way of example in FIG. 8 (based on a time server 1100 as shown in FIG. 7).

It goes without saying that the implementation of such sensors can also be provided in the case of time servers as shown in FIG. 4 or 6.

Alternatively or additionally, a GPS receiver can also be implemented in a time server as shown in FIG. 4 or 6.

It can be provided that an external synchronization message 1192 contains a further data field in which data about the internal status of the time server 1100 is published in order to give an external monitoring system the opportunity to check the internal function of the time server using the external synchronization messages 1192. These data can relate to the measured time differences, the calculated correction value of the global time or the field strength of the GPS receiver among other things.

In general, i.e. also for all embodiments of the invention, it is advantageous that the time server is made up of two subsystems, wherein each subsystem has a component 1100, 1130 that generates (and preferably signs) external synchronization messages, and a further component 1120, 1140 that receives this external synchronization message generated by the other component of its subsystem, wherein the latter component of each subsystem transmits the external synchronization message to an external receiver. This system structure has the advantage that the subsystems can be arranged at different locations. The failure of a subsystem can be tolerated.

Each subsystem preferably has its own GPS receiver and/or its own power supply.

LITERATURE CITED

ISO standard ISO 26262 on functional safety
[Kop11] Kopetz, H. Real-Time Systems, Design Principles for Distributed Embedded Applications. Springer Verlag. 2011
[Kop19] Kopetz, H. Simplicity is Complex: Foundations of Cyber-physical System Design. Springer Verlag. 2019
[Pea80] Pease, M., R. Shostak, & L. Lamport, Reaching Agreement in the Presence of Faults. Journal of the ACM, 27 (2): p. 228-234. 1980.
[Dvo09] Dvorak, D L Editor. NASA Study on Flight Software Complexity. Final report. Jet Propulsion Laboratory, Pasadena, Cal. USA. 2009.
[Dan97] Dana, P. H. *Global Positioning System (GPS) Time Dissemination for Real-Time Applications*. Real-time systems. Vol 12. No. 1., pp. 9-40. 1997.
[Tay01] Taylor, B. Ed. *The International System of Units*. NIST Special Publication 130. 2001 Edition. National Institute of Standards and Technology (NIST). US Department of Commerce. 2001.

The invention claimed is:

1. A real-time computer system comprising a distributed real-time computer system for controlling a technical device, wherein the real-time computer system comprises:
data acquisition components which are independent of each other, the data acquisition components being configured to acquire sensor data; and
data processing components for processing the sensor data,
wherein the data acquisition components are non-safe components,
wherein the real-time computer system further comprises a time server as well as a first communication system and a second communication system,
wherein the time server is configured to periodically transmit global time signals to the first communication system via one or more unidirectional communication lines and to the second communication system via one or more unidirectional communication lines,
wherein the communication systems are independent of each other,
wherein each data acquisition component has at least two communication controllers, each data acquisition component being connected to the first communication system by one of the at least two communication controllers via at least one communication line, and being connected to the second communication system by another of the at least two communication controllers via at least one communication line, such that each data acquisition component transmits or can transmit its sensor data to each of the at least two communication systems,
wherein each data processing component has at least two communication controllers, each data processing component being connected to the first communication system by one of the at least two communication controllers via at least one communication line, and being connected to the second communication system by another of the at least two communication controllers via at least one communication line, such that each communication system transmits or can transmit the sensor data received from the data acquisition components to each of the data processing components, and wherein each data processing component can process the received sensor data.

2. The real-time computer system according to claim 1, wherein the time server is fault tolerant.

3. The real-time computer system according to claim 1, wherein one data processing component consists of processing subcomponents (VUKs) or comprises VUKs, which are configured to exchange real-time data via a non-redundant, subordinate real-time communication system, a real-time sub-communication system, wherein the real-time sub-communication system, or a message distribution unit of the real-time sub-communication system which accepts the sensor data transmitted to the data processing component, has at least two communication controllers, wherein one of the at least two communication controllers is configured to receive the sensor data from the first communication system, and another communication controller of the at least two communication controllers is configured to receive the sensor data from the second communication system, and wherein the real-time sub-communication system or a message distribution unit of the real-time sub-communication system further comprises a communication controller.

4. The real-time computer system according to claim 1, the at least two communication systems of the real-time computer system being real-time communication systems comprising time-triggered real-time communication systems.

5. The real-time computer system according to claim 1, the real-time computer system or the at least two independent communication systems being configured to transmit the sensor data to at least two or more data processing components without feedback.

6. The real-time computer system according to claim 1, wherein the communication lines between the data acquisition components and/or data processing components on the one hand and the communication systems on the other hand are galvanically separated.

7. The real-time computer system according to claim 2, wherein the data processing component directly accesses a sensor which is only assigned to this data processing component.

8. The real-time computer system according to claim 2, wherein it comprises a decision component, and wherein each data acquisition component is connected to the decision component, wherein the decision component comprises fault-tolerant hardware in which simple software is executed.

9. The real-time computer system according to claim 8, wherein the data processing component which detects a violation of the assumptions relating to the specified operational design domain (ODD) reports this to the decision component.

10. The real-time computer system according to claim 1, wherein all functions of a calculation of a trajectory are carried out by a first non-safe data processing component, a verification of the safety of this calculated trajectory is carried out exclusively by a second non-safe data processing component, and the calculation of an emergency trajectory is carried out exclusively by a third non-safe data processing component, and a decision regarding whether a fault has occurred is carried out by a single decision component.

* * * * *